E. O. MARVIN.
APPARATUS TO BREAK HENS FROM SETTING.
APPLICATION FILED NOV. 23, 1914.
1,148,394. Patented July 27, 1915.
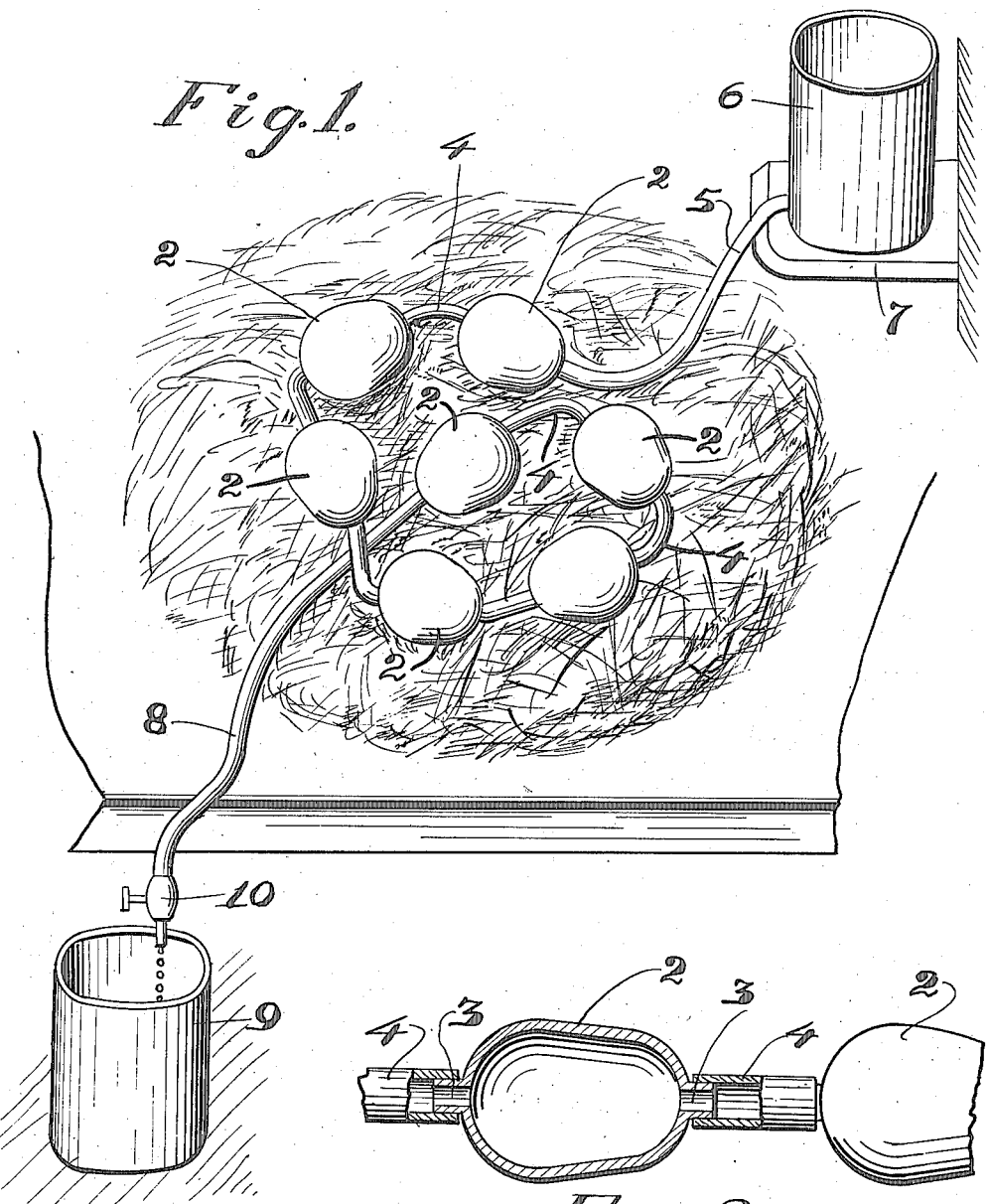

UNITED STATES PATENT OFFICE.

ERNEST O. MARVIN, OF NEW YORK, N. Y.

APPARATUS TO BREAK HENS FROM SETTING.

1,148,394. Specification of Letters Patent. Patented July 27, 1915.

Application filed November 23, 1914. Serial No. 873,563.

*To all whom it may concern:*

Be it known that I, ERNEST O. MARVIN, a citizen of the United States, residing at New York, in the county of New York and State of New York, have invented certain new and useful Improvements in Apparatus to Break Hens from Setting; and I do hereby declare the following to be a full, clear, and exact description of the invention, such as will enable others skilled in the art to which it appertains to make and use the same.

This invention relates to apparatus to break hens from setting, the principal object being to provide means for cooling the nest eggs so that the hen cannot get them sufficiently warm for her purpose, and will then abandon the nest and become a normal egg layer.

With the above and other objects in view, my invention consists of the apparatus illustrated in the accompanying drawing, in which, Figure 1 is a perspective or diagrammatic view of the apparatus in position for use, and Fig. 2 is a detail sectional view showing the hollow nest eggs and the manner of connecting them to the short tubular section.

Referring to the drawing, the numeral 1 designates a hen's nest, and 2 are the nest eggs, said nest eggs being hollow and provided with nipples 3 at the opposite ends thereof. Connected to the nipples 3 at each end of the hollow egg is a rubber tube 4, said tubes being connected to the next adjacent egg 2, and any suitable number of said eggs may be used and placed in the nest 1.

Connected to one end egg of the series is a flexible hose or tube 5, which communicates with a cold water receptacle 6 mounted on a suitable shelf 7 above the nest. The opposite end egg 2 has connected to it an outlet tube or hose 8, the end of which discharges into a receptacle 9, and said discharge hose or tube 8 is provided with a suitable valve 10 which may be used to regulate the discharge of water into the receptacle 9. The nest eggs 2 may be made of any suitable material like porcelain, glass, or any material which will hold water.

When a hen is ready to set, her temperature is considerably above the normal, and when sitting on the eggs 2, a constant circulation of cold water through said eggs will gradually lower her temperature until she is relieved of the burning sensation and is then practically cured of the desire to set.

Various changes may be made in the details of construction without departing from the spirit and scope of the invention as defined in the claims.

What is claimed is:—

1. An apparatus for breaking hens from setting, comprising a cold water tank, a tube leading from said tank, a plurality of hollow nest eggs connected to said tube and connected together by flexible tubes, and a tube connected to one of the eggs leading to a discharge receptacle, and a regulating valve in said last mentioned tube.

2. An apparatus for preventing hens from setting, which comprises a series of hollow nest eggs connected together by suitable tubing, a hose or tube leading from one of said eggs and communicating with a cold water tank and a hose or tube leading from another egg in the series to a point of discharge and said tube having means for regulating the discharge of water.

3. An apparatus of the character described comprising a series of hollow nest eggs flexibly connected together by means of tubes, said nest eggs provided each with a nipple at their ends to which the tubes are connected, a cold water tank, a tube leading from said tank to one of said eggs, and a discharge tube leading from one of the eggs to a discharge receptacle, and means for regulating the flow of water to said tubes and nest eggs.

In testimony whereof I affix my signature in presence of two witnesses.

ERNEST O. MARVIN.

Witnesses:
  THOMAS A. O'BRIEN,
  RAYMOND E. FRANCE.